United States Patent [19]

Moore et al.

[11] Patent Number: 4,980,795
[45] Date of Patent: Dec. 25, 1990

[54] SYSTEM FOR DISCHARGING AND OTHERWISE CONTROLLING ELECTRIC CHARGE ON OBJECTS SUCH AS AIRCRAFT IN FLIGHT

[75] Inventors: Charles B. Moore; Marx Brook, both of Socorro; Clyde Richards, Per Alta, all of N. Mex.

[73] Assignee: The United States of America as represented by the Secretary of the Navy, Washington, D.C.

[21] Appl. No.: 282,187
[22] Filed: Dec. 9, 1988
[51] Int. Cl.$^5$ .............................................. H05F 3/06
[52] U.S. Cl. .................................. 361/218; 361/220; 361/225
[58] Field of Search ........ 361/212, 216, 217, 218-220, 361/225-226

[56] References Cited

U.S. PATENT DOCUMENTS

| | | | |
|---|---|---|---|
| 3,035,208 | 5/1962 | Clark | 361/225 |
| 3,600,632 | 8/1971 | Bright et al. | 361/218 |
| 3,733,038 | 5/1973 | Ikrath et al. | 361/218 |
| 3,874,616 | 4/1975 | Buser et al. | 361/218 |
| 4,228,479 | 10/1980 | Larigaldie et al. | 361/218 |

OTHER PUBLICATIONS

M. Brook et al., A Helicoper Electric Charge Control Study: A Report of Work Performed under ONR Contract N00014-84-K-0623 during the Contract Period from Aug. 1, 1984 through Jul. 31, 1986 (Jul. 3, 1986, cover date).

Primary Examiner—A. D. Pellinen
Assistant Examiner—Jeffrey A. Gaffin
Attorney, Agent, or Firm—Thomas E. McDonnell; Edward F. Miles

[57] ABSTRACT

A method and apparatus for discharging electric charge accumulated on an object tht expels an electrically conductive gas flow, such as a jet engine, a rocket, or a helicopter or aircraft with an internal combustion engine. The system has an electrical shield surrounding a portion of the gas flow, and an electrode for imposing an electric potential in the shielded gas flow. A servo controller measures the accumulated charge at a point on the object and creates a control signal responsive to the rate at which charge is accumulating. The servo controller imposes an electric potential on the electrode, and hence the gas flow, of an amount and polarity determined by the rate and polarity of charge accumulation. In so doing, the electrode accelerates charges of opposite polarity in the conductive gas away from the object, and deaccelerates like charges towards the object, where they tend to cancel accumulated charges, thus discharging the object.

2 Claims, 2 Drawing Sheets

SYSTEM FOR DISCHARGING AND OTHERWISE CONTROLLING ELECTRIC CHARGE ON OBJECTS SUCH AS AIRCRAFT IN FLIGHT

SPECIFICATION

The invention pertains to systems for electrically discharging objects which expel a conductive gas flow, such as rockets, jet aircraft, and helicopters and other such aircraft that use internal combustion engines.

BACKGROUND OF THE INVENTION

Aircraft in engine powered flight, especially those flying in clouds of dust, rain or ice, often become highly charged electrically. This can cause operational problems. For example, for a helicopter crew hovering over a dusty surface to attempt to lift objects off the ground requires that a crewman grab a metallic cable hanging from the helicopter and attach it to ground-based objects. The ground crewman often receives a severe electrical shock upon his making contact with the helicopter cable. Attempts to eliminate this hazard by use of non-conducting hoist cables have not been acceptable in many applications because the lifting attachment, such as a hook on the lower end of the cable, must be controlled remotely by the aircraft pilot, and this requires the use of conducting wires from the fuselage to the hook for signals and acuating power. Attempts to ground the helicopter before direct contact by the ground crew also have not been successful in all operations due to the difficulty of getting a good ground connection, and because of the operational difficulties with cables swinging violently in the downwash of air beneath the helicopter.

Similarly, with fixed wing airplanes flying through thunderclouds, ice crystals, or rain, the charging often becomes so great that electrical discharges into the surrounding air occur, producing radio-frequency noise which interferes with necessary external communications. The charging of research aircraft makes difficult any measurements of natural electrical conditions inside thunderclouds, and can often cause the taking of erroneous data.

For these reasons, an acceptable means of controlling the charge on an aircraft in flight has been greatly needed.

U.S. Pat. No. 3,035,208 to Clark shows a system directed towards this end. Clark notes that, in good weather, engine exhaust is often capable of maintaining aircraft electrically discharged, or at a small charge. Clark discloses a system having a detector to determine the polarity of charge on the aircraft, and an electrode exposed to the stream of exhaust gas from the aircraft's engine to collect ions from the gas stream. A controller in the system sets the polarity on the electrode so that ions that are collected are of the correct polarity to discharge the aircraft. Another electrode of opposite polarity may be added to deflect additional charge towards the first electrode, making this charge collection more efficient.

In addition to Clark's observations, it is today generally recognized that an isolated aircraft in flight becomes electrified principally as a result of elastic collisions involving contact electrification with atmosphereic particles, by inductive effects arising when water drops leave the aircraft surface in an electric field, and currents flowing in the hot exhaust gases from the engine under the influence of local electric fields.

We have found that this last effect is dominant for the charging of hovering helicopters, whether in dust clouds or in the absence of dust or aerosols (e.g. helicopters hovering over ships at sea in good weather), and we have found that the best way to minimize this charging is to control the electric fields acting on the hot exhaust gases. Although our experimental work has been generally limited to helicopters, we believe that similar charging phenomena on other kinds of aircraft similarly result predominantly from local electric fields operating on exhaust gases expelled by the aircraft, and that control of these external electric fields would similarly best control unwanted aircraft charging.

In particular, these local, external, electric fields cause charge separation much as result from the charge on the electrodes described in Clark's patent. Charges of the same polarity as the external field are deaccelerated and remain in the vicinity of the aircraft, where a portion of these charges accumulate on the exhaust stack and engine walls, charging the aircraft. Charges in the exhaust gas opposite in polarity to the external electric field are accelerated away from the aircraft, and, either have no effect, or, in the case of a hovering helicopter are caught in the downdraft of the helicopter's rotors and swept downward and away. The removal of these charges that are opposite in polarity to the external fields in the vicinity of the exhaust stack in effect increases the external electric field there, reinforcing the basic cause of the helicopter's charging, worsening it. Aerosols or dust provide an excellent medium for transporting these downward charges, and their presence exacerbates this unwanted positive charging feedback.

As examples of this mechanism, we have measured electrical currents in excess of 300 micramperes flowing in tested exhaust gases when we applied strong electric fields to them, and we have controlled the charge on an isolated jet engine merely by placing a charged piece of plastic near, but outside, the exhaust plume. The electric fields from the charge on the plastic caused ions of one polarity to be selectively carried away from the engine by the exhaust gases, and causes it to be highly charged with the same polarity as the plastic.

As another example, for a helicopter disposed on an electrically isolated stand, by electrically shielding the two exhaust stacks from local charges and from charges emitted in the escaping exhaust plume, we have caused the helicopter to charge to potentials in excess of 150 kV with the application of potentials of only 10kV to an electrode mounted in each of its exhaust stacks.

SUMMARY OF THE INVENTION

Accordingly, an object of the invention is to permit the effective, continuous, discharging of objects which expel a conductive gas, e.g. the exhaust gas of rockets, jet aircraft, and helicopters and other aircraft that use internal combustion engines.

Another object is to do this by using feedback control in a manner that is inherently highly responsive to accumulated charge, but nonetheless highly stable in operation.

Another object is to minimize the effect of local electric fields in the vicinity of exhaust flows on the charging of such objects.

Another object is to do the foregoing in a manner that is inherently simple, using hardware that is rugged, reliable, and inexpensive.

In accordance with these and other objects made apparent hereinafter, the invention is a method and apparatus for discharging a point of a physical object, the object being of a kind that expels an electrically conductive gas flow, such as an electrically isolated aircraft in flight. The invention operates to electrically discharge a preselected point of the object by electrically shielding a portion of the gas flow, applying a preselected electric field at a preselected point in the shielded portion of the gas flow, measuring the rate of change of the electric field at the preselected point of the object, and changing the preselected electric field at the preselected point in the portion of the gas flow by a preselected amount responsive to the rate of change of the electric field at the preselected point of the object. The magnitude and polarity of the preselected amount is selected to effectively reduce the absolute value of the electric field at the preselected point on the object. By electrically shielding a portion of the gas flow, e.g. that portion immediately adjacent to the engine exhaust gases, the system isolates the exhaust from external electric fields which most contribute to the separation of charge and the object's charging. With this shielding, only the preselected electric potential contributes to charging, which the servo control maintains at the correct polarity to ensure that charge directed to the object will discharge, rather than further charge, it. Because the magnitude of the preselected electric potential is related in a preselected manner to the rate of change of the electric potential of the aircraft, i.e. the rate at which it is charging up, the system responds most strongly when external conditions are causing the aircraft to charge most rapidly, increasing the system's effectiveness.

The foregoing discusses discharging at a point on an object, rather than the entire object. An object will not necessarily be electrically conductive throughout its entire volume. For practical applications it is not always necessary to discharge all of it. (E.g., a helicopter lowering cargo need only discharge the hoist grasping the cargo.)

The invention is more fully understood from the following detailed description of preferred embodiments, it being understood, however, that the invention is capable of extended application beyond the precise details of the preferred embodiments. Changes and modifications can be made that do not affect the spirit of the invention, nor exceed its scope, as expressed in the claims below. Accordingly, the invention is described with particular reference to the accompanying drawings, wherein:

DETAILED DESCRIPTION

Figure 1:
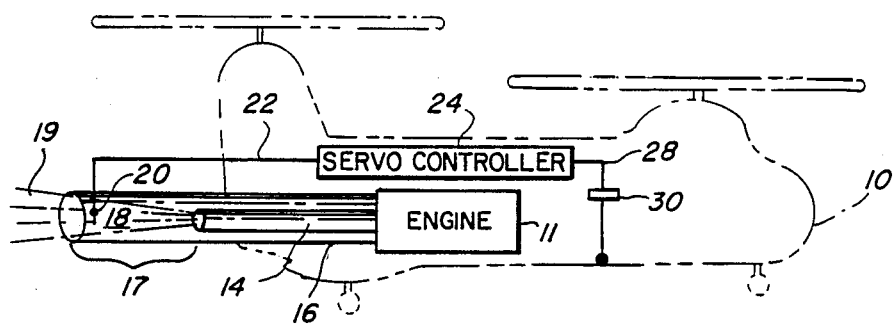
FIG. 1 is a schematic drawing illustrating broadly the workings of the invention.

With reference to the drawing figures, wherein like references indicates like structure throughout the several views, FIG. 1 illustrates broadly the workings of the invention. An object 10, which is illustrated as a helicopter in FIG. 1 for purposes of exemplifying the preferred embodiments, has an engine 11 with an exhaust stack 14 for expelling a flow 19 of engine exhaust. Surrounding exhaust stack 14, and electrically fixed to engine 11, is shield 16, which, by surrounding exhaust stack 14 and portion 17 of exhaust flow 19, electrically shields stack 14 and flow portion 17 from electric fields external to shield 16. Shield 16 can be any conventional and appropriate structure used for electrical shielding, for example simple and inexpensive wire mesh wound into a cylinder and mounted radially about exhaust stack 14. Inside shield 16 is an electrode 18 which is mounted on, and is electrically isolated from, shield 16 by penetration 20. Helicopter 10 has a servo controller 24 whose output 22 feeds electrode 18, and whose input 28 is from electric field sensor 30, which measures the electric field at point 26 of helicopter 10. Electrode 18 is disposed in, or immediately adjacent to, portion 17 of flow 19. In this manner, an electric field imposed on electrode 18 is similarly imposed on flow portion 17, and, because shield 16 isolates flow portion 17 from external fields, selectively varying the electric field on electrode 18 permits one to selectively control the electric field on conductive gas flow portion 17, and control the charging of object 10 resulting from exhaust flow 19.

Sensor 30 can be an electric field mill, an operational electrometer combined with a potential equalizer such as a small radioactive source (e.g. $Po^{210}$), or any conventional device to infer electric field strength. The following describes sensor 30 as an electric field sensor. Helicopter 10 could lower a cable to ground to establish an electrical reference, and use any conventional voltage sensor. Use of an electric field sensor will cause servo controller 24 to discharge helicopter 10 to the potential of the surrounding air, i.e. as helicopter 10 lowers itself to ground, the air surrounding it is continually lowering its potential towards ground, and servo controller 24 will continuously discharge point 26 to accommodate this. With a ground cable and a voltage sensor for member 30, servo controler 24 discharges point 26 to ground directly These are, however, fundamentally the same processes. Because no electrical potential difference exists absent an electric field, the terms electric field and electric field sensors, as used herein comprehend voltage and voltage sensors.

Figure 2:
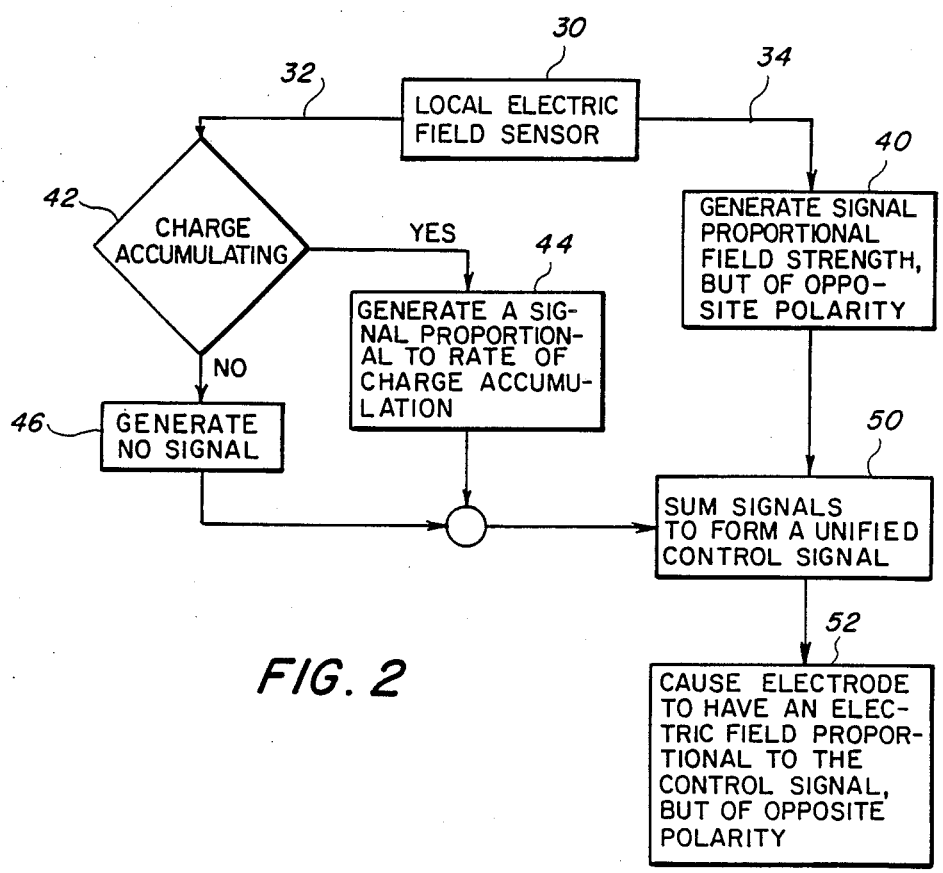
FIG. 2 is a flow chart illustrating the operation of the feedback control system of the invention.

FIG. 2 illustrates a preferred method by which servo controller 24 discharges point 26 of helicopter 10 by automatically controlling the electric field on electrode 18. Electric field sensor 30 produces a signal proportional to electric field strength at point 26, and delivers it in parallel (i.e. for parallel processing) as indicated by flow diagram lines 32, 34. Controller 24 decides whether charge of either polarity is accumulating at point 26 (indicated on FIG. 2 by illustrative numeral 42), and, if so, controller 24 generates a signal proportional to the rate of charge accumulation (44), which is forwarded to 50; if not, no signal is generated (46). Simultaneously, controller 24 generates a signal proportional to the electric field strength at point 26, but of opposite polarity (40), which too is forwarded to 50 for summation with the signal generated by branch 32. The sum of these two signals forms a unified control signal (50), which controler 24 uses to cause electrode 18 to maintain an electric field proportional to the unified control signal, but of opposite polarity.

The component of the unified control signal that is proportional to the rate of charge accumulation causes the magnitude of the unified control signal to depend strongly on this rate of accumulation, permitting controller 24 to impose larger fields to electrode the larger the rate of charge accumulation. Because this component is zero if charge is not accumulating (i.e. point 26 is in equilibrium, or is discharging) this component cannot counter this desirable condition.

The component of the unified control signal which is proportional to field strength at point 26, being of opposite polarity to the component proportional to charge accumulation, constitutes a negative feedback component in the unified control signal, which lends stability to controller 24, and eliminates or minimizes the likelihood of system oscillation, ringing, and overshoot, as is well understood by those skilled in this art, or otherwise versed in elementary systems control theory.

Figure 3:
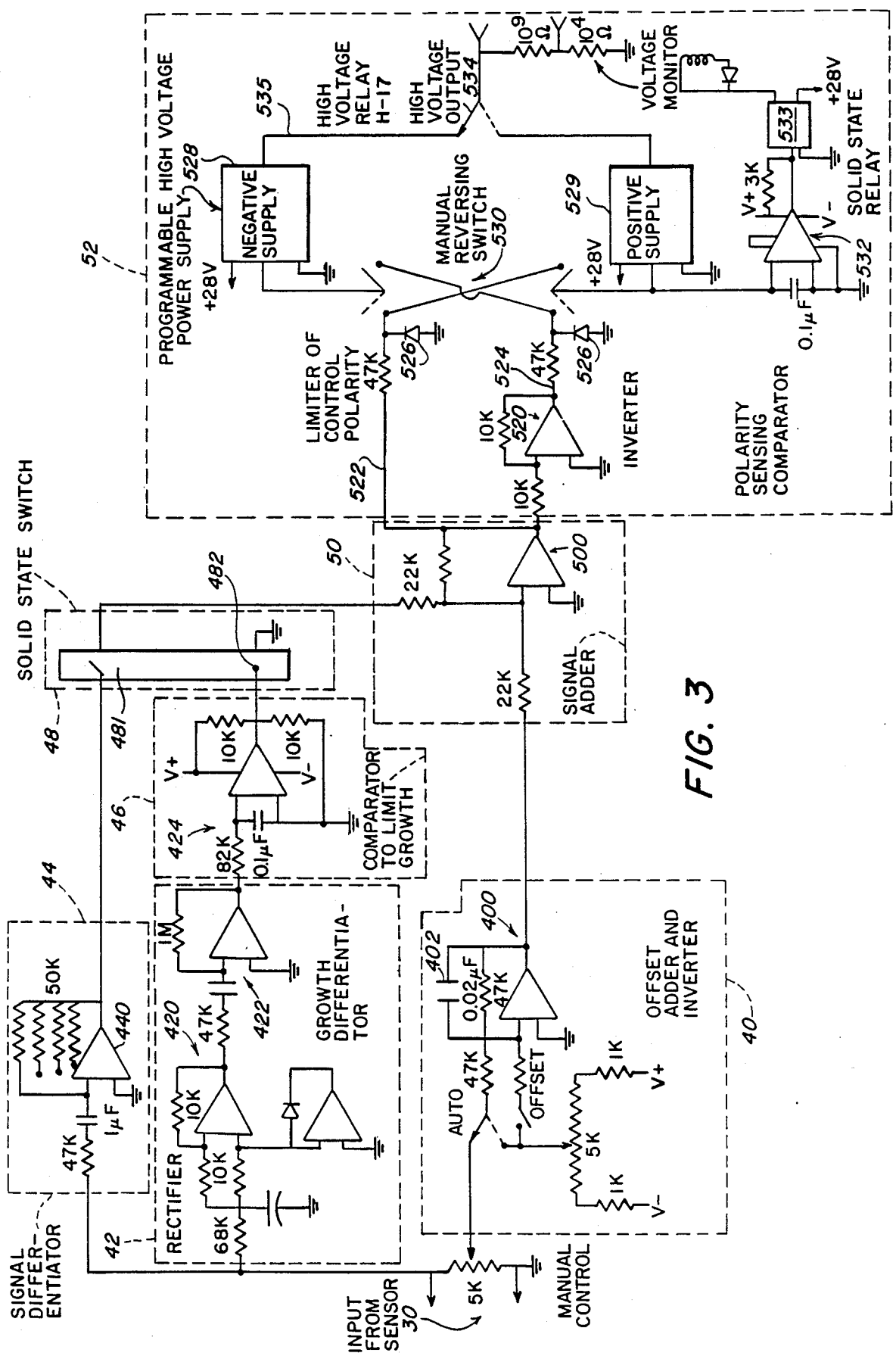
FIG. 3 is a diagram of an electronic circuit to perform this feedback control.

FIG. 3 shows a circuit for implementing the operations of FIG. 2 employing operational amplifier electronics. The output signal of sensor 30 is fed in parallel to three circuit legs 40, 42, 44 which correspond in respective functions to the steps having the same illustrative numerals in FIG. 2 (as do all features of the drawing figures having the same numerals). Circuit leg 44 is a conventional operational amplifier differentiator, and by differentiating the signal from sensor 30 (which is proportional to the electric field at point 26), outputs a signal proportional to the rate of charge accumulation at point 26. The plurality of feedback resistors for amplifier 440 of differentiator 44 are to permit an operator to choose a plurality of amplifier gains.

Circuit leg 42 has a full wave rectifier 420, whose output feeds another differentiator 422. Thus rectifier 420 and differentiator 422 together produce a signal output proportional to the absolute value of the rate of charge accumulation at point 26. Zero crossing comparator 424 operates to permit an output from leg 42 only if the output of differentiator 422 is positive, i.e. if the absolute value of charge at point 26 is increasing and charge accumulating. The output of comparitor 424 triggers the enabling gate 482 of solid state switch 481, which is thus enabled only if charge is accumulating at point 26. In this manner switch 481 isolates the output of circuit leg 44 from the remainder of the circuit unless charge is accumulating at point 26.

Circuit leg 40 has an inverting amplifier 400 which outputs a signal proportional to the output of sensor 30. In addition to adjusting amplifier gain, the magnitude of this output can be set by adjusting manual setpoint circuitry 404. Capacitor 402 gives inverting amplifier 400 a high frequency fall off to prevent spikes and the like from interfering with circuit operation.

The output of switch 48 and (ultimately, of leg 44 as controlled by leg 42) inverting amplifier 400 are fed into differential amplifier 500, where the signals are summed to form the unified control signal, which is in turn output in parallel to circuit legs 522 and 524. The output of legs 522, 524 are fed respectively into conventional programmable power supplies 528, 529, which are programmed to output at 535, 536, signals proportional to those of respective circuit legs 524, 522. Leg 524 has an inverting amplifier 520, so the signal in legs 522, 524 are equal in magnitude (i.e. to the unified control signal), but of opposite polarity. Diodes 526 ensure that whichever of these legs has a negative polarity is shorted to ground. The result is that whichever of legs 522, 524 is negative will cause its associated power supply to have zero output, and whichever is positive will cause its associated power supply to have an output proportional in magnitude to the unified control signal (the output of summer 500). Polarity sensor 532 senses which of legs 522, 524 is positive, and triggers solid state relay 533 to connect whichever of power supplies 528, 529 is enabled to output 22, and thence to electrode 18, where the signal provides the desired corrective electric field within shield 16. Circuit legs 522, 524 are preferably connected to power supplies 528, 529 by manual reversing switch 530 so as to permit an operator to quickly reverse polarity of output 535 if any application of the circuit would necessitate this.

Summarizing the operation of the circuit of FIG. 3, sensor 30 provides circuit legs 40, 42, 44 with a signal proportional to the electric field at point 26 of helicopter 10. Leg 44 differentiates this signal, i.e. generates a signal indicating the rate of charge accumulation at point 26, and leg 42 determines whether this rate indicates charging or discharging. If the former, leg 42 enables switch 481 to pass the signal of leg 44 to summer 50; if the latter, leg 42 disenables switch 481 so that the output of leg 44 is disconnected from the circuit (and cannot interfere with the desirable discharging). Circuit leg 40 produces a scaled signal indicating the magnitude of charge accumulated at point 26, but of opposite polarity to that of leg 44, to provide the servo controller 24 with stabilizing negative feedback, as well as a quiescent, or "homing" setpoint for the system. The signals of legs 40 and 44 are summed at 500 to produce a unified control signal for the system Depending on the polarity of this signal, i.e. the polarity of point 26 as indicated through circuit leg 44, circuit legs 522, 524, and polarity sensor 532, choose which of power supplies 528, 529 shall be connected to electrode 18. These power supplies are programmed to output to electrode 18 a signal of a magnitude proportional to the outputs of their respective circuit legs 522, 524, so that the magnitude of the corrective signal on electrode 18 depends strongly on the rate at which charge is accumulating on point 26, i.e. depends on the degree to which correction is required.

The invention has been described in what is considered to be the most practical and preferred embodiments. This is done for purposes of illultration rather than limitation. For example, the servo controller steps of FIG. 2 could be performed by a programmed, dedicated, process computer whose output could be fed, for example, directly to manual switch 530. It is recognized that obvious modifications within the scope of the invention may occur to those with skill in this art. Accordingly, the scope of the invention is to be discerned solely by reference to the appended claims, wherein:

What is claimed and desired to be secured by Letters Patent of the United States is:

1. A system for electrically discharging a preselected point of an object, said object comprising means for expelling an electrically conductive gas flow, said system comprising:
   means for shielding a portion of said gas flow from electric fields external to said portion;
   means for applying a preselected electric field at a preselected point in said portion of said gas flow; and
   a feedback controller, said feedback controller comprising:
   means for measuring the rate of change of the electric field at said preselected point of said object; and
   feedback servo control means for changing said preselected electric field at said preselected point in said portion of said gas flow by a preselected amount responsive to said rate of change measured by said means for measuring, said feedback servo control means comprising means for selecting the magnitude and polarity of said preselected amount to be effective to reduce the absolute value of said electric field at said preselected point on said object.

2. A method for electrically discharging a preselected point of an object, said object comprising means for expelling an electrically conductive gas flow, said method comprising:

shielding a portion of said gas flow from electric fields external to said portion;

applying a preselected electric field at a preselected point in said portion of said gas flow;

measuring the rate of change of the electric field at said preselected point of said object; and changing said preselected electric field at said preselected point in said portion of said gas flow by a preselected amount responsive to said rate of change of the electric field at said preselected point of said object, the magnitude and polarity of said preselected amount being effective to reduce the absolute value of said electric potential at said preselected point on said object.

* * * * *